Aug. 25, 1953  R. M. BUCKERIDGE ET AL  2,649,955
CONVEYER BELT CONTROL
Filed Sept. 18, 1951  3 Sheets-Sheet 1
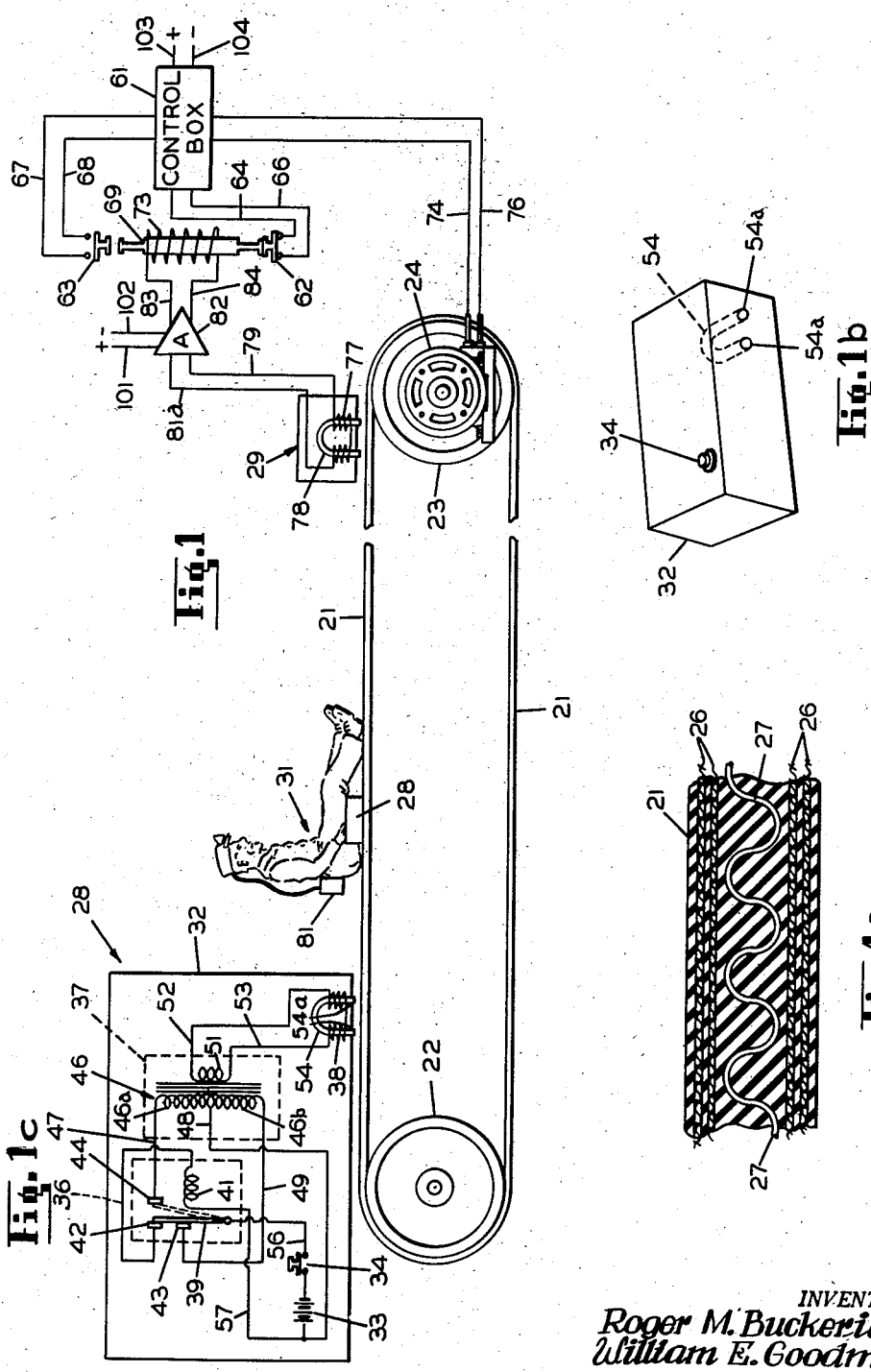
INVENTORS
Roger M. Buckeridge
William E. Goodman
BY Murray G. Gleeson
ATTORNEY Aug. 25, 1953   R. M. BUCKERIDGE ET AL   2,649,955
CONVEYER BELT CONTROL
Filed Sept. 18, 1951   3 Sheets-Sheet 2
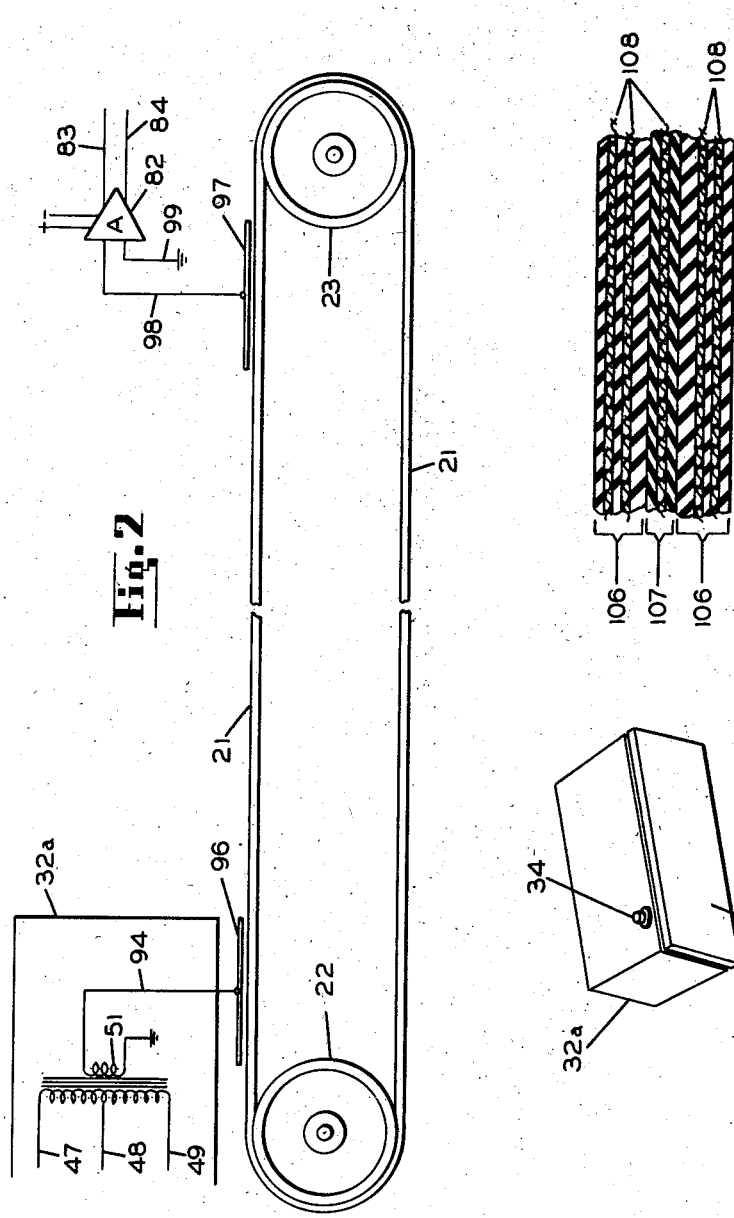
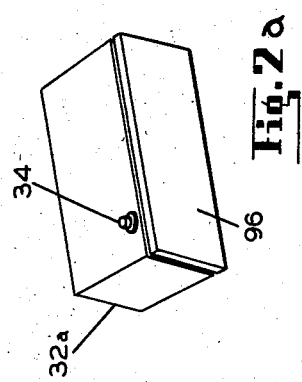
INVENTORS
Roger M. Buckeridge
William E. Goodman
BY Murray A. Gleeson
ATTORNEY Aug. 25, 1953     R. M. BUCKERIDGE ET AL     2,649,955
CONVEYER BELT CONTROL
Filed Sept. 18, 1951     3 Sheets-Sheet 3

INVENTORS
Roger M. Buckeridge
William E. Goodman
BY Murray Q. Gleeson
ATTORNEY

Patented Aug. 25, 1953

2,649,955

UNITED STATES PATENT OFFICE 2,649,955

CONVEYER BELT CONTROL

Roger M. Buckeridge, Downers Grove, and William E. Goodman, Chicago, Ill., assignors to Goodman Manufacturing Company, Chicago, Ill., a corporation of Delaware Application September 18, 1951, Serial No. 247,092

8 Claims. (Cl. 198—203)

This invention relates to belt conveyors of the type used underground in mines and more particularly to a control system whereby a man can control the starting and stopping of the conveyor from any position along the belt, whether he is standing on the ground alongside the belt or whether he is riding it.

Heavy duty conveyor belts, of the type used underground in mines for moving material and personnel are usually continuously driven from a single power source such as an electric motor having magnetic relays for controlling the motor from any point remote therefrom. The belts are of appreciable length, in some cases four to ten thousand feet long, and from a practical standpoint, control stations must, of necessity, be provided along the path of travel of the belt so that it may be stopped or started as desired from those stations to permit loading or unloading of material, and for personnel who may wish to ride.

One conventional arrangement for effecting remote control of conveyor belts of the above-mentioned type is by means of pushbutton control stations or pull-out switches located at spaced points along the path of travel of the belt. While this arrangement is satisfactory to effect control from a plurality of separate locations lengthwise of the belt, it does not permit continuous control, that is control of the conveyor belt from every point along its travel.

Special safety problems are encountered in underground workings, such as coal mines, where the conveyor belts are used to transport personnel, tools and supplies, as well as coal. The practice of transporting personnel on underground conveyor belts can be safely carried out only when complying with stringent safety regulations which require, among other things, that the belt be equipped with a continuous switch control whereby the belt may be stopped or started at any time by a person riding thereon. In other words, according to coal mining regulations presently effective in certain areas, positive control of the conveyor belt must be provided for each linear foot of the conveyor travel.

One arrangement for providing continuous control by personnel riding a belt is disclosed in Patent 2,534,110, utilizing two or more bare wires running along side the entire length of the conveyor. A man riding the belt can stop or start it merely by reaching out and bridging two of the wires with his bare hand or with a jumper carried for that purpose. This arrangement is not entirely satisfactory since there is a substantial amount of labor involved installing the long lengths of wires and maintaining them and there is always the possibility that, somewhere along their length, the bare control wires may become accidentally shorted-out against a dangerously high voltage power line which could cause death or extremely severe injury to a man touching the control wires.

Accordingly, an important object of the present invention resides in providing a control system eliminating the need for bare wires running alongside the conveyor and which must be handled by the personnel using the belt. With this in view, the present invention involves the provision of a belt which is electrically conductive, either by virtue of wires or some other conductive element such as a ply of conductive rubber embedded within the belt. Each man likely to ride or use the belt is provided with a small, pocket-size signal transmitter which is electro-magnetically or electrostatically coupled with the conductive element in the belt when the transmitting unit is placed near the belt so as to transmit a signal into the latter. A receiving unit is located at some fixed point along the belt and likewise electromagnetically or electro-statically coupled thereto and it picks up the signal, amplifies it, and transmits it to control apparatus for starting, stopping, or reversing the belt as required.

Other objects and advantages will be seen in connection with the following description and the accompanying drawings in which:

Figure 1 is a diagrammatic view of one embodiment of the present invention;

Fig. 1a is a fragmentary longitudinal cross section of one form of electrically conductive belting which may be employed in the conveyor;

Fig. 1b is an isometric view of one form of portable signal transmitter which may be employed in connection with the Fig. 1 embodiment;

Fig. 1c is a circuit diagram for the signal generator and transmitter shown in Figs. 1 and 1a;

Fig. 2 is a modified form of the invention in which both the signal transmitter and receiver are electro-statically or capacitance coupled with the conveyor belt;

Fig. 2a is a view similar to Fig. 1b showing a modified form of portable signal transmitter which may be used in connection with the Fig. 2 embodiment;

Fig. 3 is a modified form of electrically conductive belting;

Fig. 5 is a fragmentary, isometric view of a joint for a belt as shown in Fig. 1a.

Figure 4:
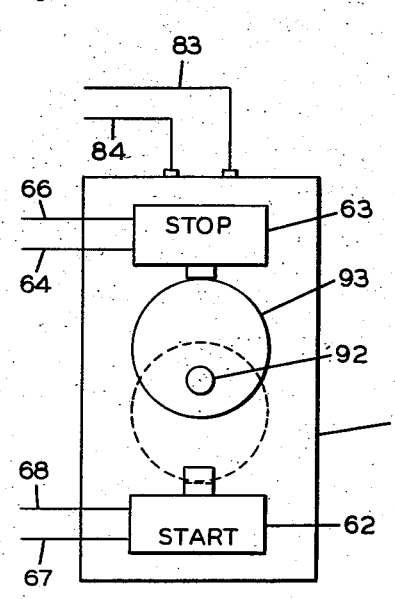
Fig. 4 is a modified form of a signal receiver employing a stepping relay.

Referring now more particularly to the embodiment shown in Figs. 1, 1a, and 1b, the numeral 21 designates an endless belt trained about direction-changing pulleys 22 and 23, the latter being rotatably driven by an electric motor 24. As shown in Fig. 1a, the belt may be of rubber-like material strengthened by plies of fabric 26 in the customary manner and, additionally, provided with an inner, electrically conductive wire (or wires) 27 preferably having a serpentine shape to accommodate stretching of the belt.

A portable signal transmitter generally designated 28 generates a signal which may be transmitted into the belt and picked up by a receiver generally designated 29.

The signal generator 28 is doubly illustrated in Fig. 1, first in the hand of a man 31 showing how he would use it to control the operation of the belt on which he is riding, and, second, the interior of the signal generator is shown in enlarged diagrammatic form in which the details of the signal generating circuit may be traced.

Briefly, the signal generator 28 will be a compact housing 32, preferably small enough to fit within the miner's pocket. In the form illustrated, the generator includes a battery 33, a normally open actuating switch 34, a vibrating relay 36, a transformer 37 and a transmitting coil 38, all interconnected as will now be described. The vibrating relay 36 includes a conductive reed 39 biased to the position shown in Fig. 1 and a relay coil 41 effective when energized to move the reed to its operative position. In its biased or Fig. 1 position the reed 39 bridges both contacts 42 and 43. In its opposite position it engages contact 44. The transformer 37 has a split primary coil 46 divided into segments 46a and 46b by conductors 47, 48, and 49. The transformer has a secondary coil 51 connected in series with coil 38 by conductors 52 and 53, the coil 38 being mounted on a horseshoe core 54 having its legs 54a projecting from the bottom of the signal generator housing 32 as shown in Fig. 1b. Conductors 47 and 49 connect the ends of the primary coil 46 respectively with the contacts 44 and 43. The battery and control switch are connected in series in a conductor 56 which connects at one end to the reed 39 and at the other end it branches, making connections with the conductor 48 and the conductor 57, the latter containing the relay coil 41 and terminating in a connection with the contact 42.

When the switch 34 is closed, the reed 39 will vibrated back and forth between the position shown in Fig. 1 and an abnormal position against contact 44. This will alternately excite the primary coil sections 46a and 46b in opposite directions and induce an alternating signal current in the secondary 51 and transmitting coil 38. Thus, when the actuating switch 34 is pressed, and the signal generator housing is laid on or near the belt as shown in Fig. 1, the transmitting coil 38 will be proximate the conducting wire 27 and electro-magnetically coupled therewith to induce a like alternating current signal within the belt itself.

The receiver 29 will be fixed proximate the belt at some convenient location usually near the motor control box 61. To further simplify the disclosure in the present case the control box will be assumed to be any commercially available unit having associated therewith a start switch 62 and a stop switch 63 with the conductor leads 64, 66, 67 and 68 as shown. For the purpose of illustration, the "start" and "stop" switches are shown oppositely disposed with an armature 69 therebetween, the armature being biased (as by gravity) to the Fig. 1 position to maintain the start switch normally operated.

The receiving element which picks up the signals transmitted along the belt comprises a coil 77, wound on a horseshoe core 78 and spaced from the belt a preferably fixed distance. Conductors 79 and 81a transmit the received signal to an alternating current amplifier 82 which may be of conventional construction. And, from the amplifier, the leads 83, 84 energize the control coil 73 to hold the armature 69 upward, as long as the coil is energized, to maintain the "stop" switch actuated. Whenever the signal-actuated energization of coil 73 ceases, the armature 69 will drop restarting the conveyor by maintaining the "start" switch actuated.

In some instances it may be found desirable to modify the wiring of the signal generator 28 to utilize the usual miner's battery 81 instead of a separate battery 33, thereby making it possible for the miner to have a fresh battery daily for both his light and his signal generator without altering present mine battery maintenance procedure.

In operation, where a miner wishes to ride a belt in accordance with the present invention, he approaches the moving belt and brings the signal generator down near the belt while depressing the actuating switch 34. As soon as he brings the signal generator casing close enough to the belt to magnetically couple the transmitting coil 38 with the wire 27 imbedded in the belt, the latter will stop and will remain stopped as long as he keeps the signal generator electromagnetically coupled to the belt conductor and the actuating switch closed. He maintains the actuating switch closed while climbing onto the belt and as soon as he is comfortably or safely situated, releases the switch, thereby stopping the generated signal, permitting the control armature 69 to drop to operate the "start" switch 62 to resume movement of the conveyor. As soon as he reaches his destination, he presses the signal generating button 34 again to transmit another signal which lifts the armature 69 against the "stop" button to maintain the belt immobilized until he gets off whereupon the armature 69 drops to re-start the drive motor.

As described, the Fig. 1 embodiment employs electro-magnetic couplings between the signal generator 28 and the receiver 29.

Fig. 4 illustrates a modified form of receiver in which the coil 73 and armature 69 are replaced by a stepping relay 91 for actuating the "start" and "stop" switches 62 and 63. The stepping relay 91 is shown only diagrammatically and may comprise any conventional unit which, for instance, rotates a shaft 92 through a half revolution each time it is energized by the signal current in conductors 83, 84. At the end of the shaft 92 is an eccentric cam 93 which is positioned to actuate one or the other of the switches 62, 63 per energization of the stepping relay. For example, when the relay is actuated during the Fig. 4 condition it will rotate the cam 93 180 degrees from the solid line position to the broken line position. The next energization will return the cam to the solid line position of Fig. 4. Where maintained contact on the switch buttons is not desired, the cam 93 may be rotatably shifted 90 degrees one way or the other on its shaft.

With the substitution of the stepping relay shown in Fig. 4, it will thus be apparent that the man 31 riding the belt may alternately start and stop the belt by successive actuations of the signal generating switch 34.

The embodiment shown in Fig. 1 employs an electro-magnetic couple between the belt conductor 27 and each of the transmitting and receiving coils 38 and 77. An electro-static or capacitance couple may also be employed as illustrated in Figs. 2 and 2a where the secondary coil 51 is shown with one end grounded to the portable casing 32a and the other end connected by conductor 94 with an antenna 96 which, in this case, comprises a flat plate mounted on the bottom of the casing 32a and being suitably insulated therefrom. At the receiving end is a receiving antenna 97 which is spaced a suitable distance above the belt, preferably near the control box 61, and it is connected by conductor 98 to the amplifier 82 which, in this case, will have a connection 99 suitably grounded, as for example, to the main frame of the conveyor.

With the exception of the parts shown in Fig. 2, the transmitting and receiving units may be the same as described in connection with Fig. 1 and, as far as the rider 31 is concerned, operation will be the same depending on whether the actuating coil 73, 69 or the stepping relay 91 is employed in the receiver.

The conductive belting may assume a number of forms other than that shown in Fig. 1a. For example, as shown in Fig. 3, the belt may be made up of outer plies 106, 106 of ordinary low-conductive rubber and the inner ply 107 may be made of electrically conductive rubber, all suitably strengthened by plies of fabric 108, 108. In the present application, the belt 21 is, for convenience assumed to be joint-free, that is all in one piece.

Figure 5:
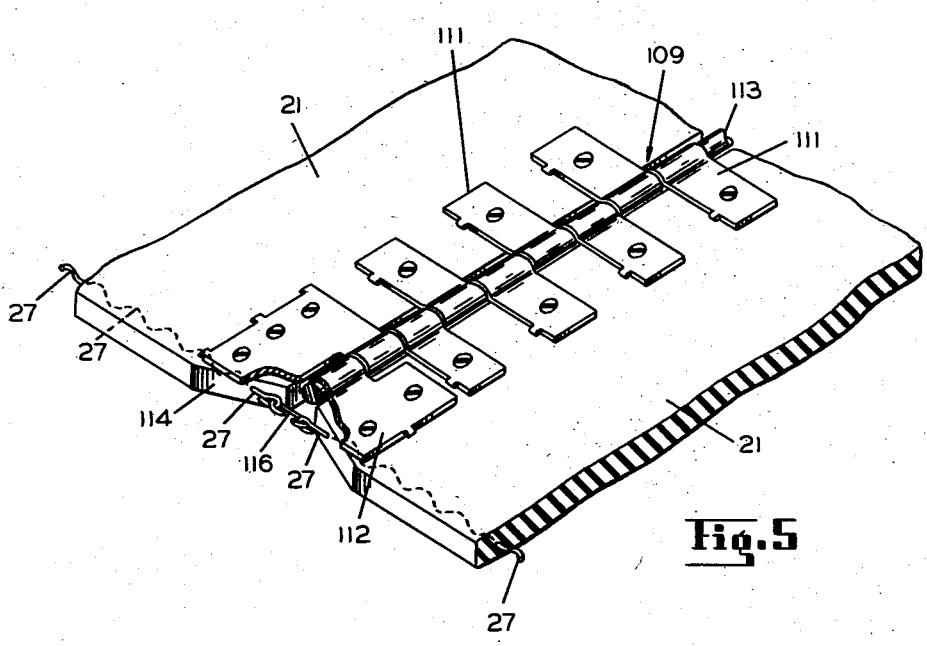

Practically, most actual installations of this type of belting are long enough to require separate sections jointed together, as shown by the joint 109 in Fig. 5. That joint includes a plurality of center hinges 111 and a pair of end hinges 112, 112 gripping adjacent sections of belt 21 together on a hinge pin 113. In making the joint, the ends of the belt sections will be beveled as at 114 to provide a cutout portion into which the ends of the adjacent wires 27 extend for splicing with a short section 116. The splice is located beneath the end hinge 112 which protects it from breakage by heavy lumps falling on the belt. While the wire 26 and the splice 116 are shown running alongside one edge of the belt, they may be located nearer the center if desired.

While specific forms in which the present invention may be embodied have been shown and described, it will be understood that various modifications and variations thereof may be effected without departing from the spirit and scope of the invention as defined by the appended claims.

We claim:

1. In a mine conveyor belt control system, an electrically conductive endless belt, a motor operably coupled to drive said belt, a portable signal generator comprising a housing suitably compact for carrying by a miner, said housing containing a transformer including a split primary coil and a secondary coil, battery means, vibrating relay means and connections for alternately exciting said primary in opposite directions to generate an alternating current signal in said secondary, switch means controlling the excitation of said primary by said battery means, said housing having a transmitting element at the bottom thereof connected with said secondary and adapted to be placed in coupled relation with said belt when the housing is disposed proximate thereto for transmitting said signal into said belt, a signal receiver coupled with said belt at a fixed position therealong, an amplifier for said signal, and control means between the amplifier and motor for controlling the operation of the latter in response to a received signal.

2. In a mine conveyor belt control system, an electrically conductive endless belt, a motor operably coupled to drive said belt, a portable signal generator comprising a transformer including a split primary coil and a secondary coil, means for alternately exciting said primary in opposite directions to generate an alternating current signal in said secondary, means for coupling said secondary to said belt when said portable generator is placed in proximity with the latter to transmit said signal to said belt, a signal receiver spaced from said belt at a fixed position therealong, an amplifier for said signal, and control means between the amplifier and motor for controlling the operation of the latter in response to a received signal.

3. In a mine conveyor belt control system, an electrically conductive endless belt, a motor operably coupled to drive said belt, a portable signal generator adapted to be placed on said belt and means within said signal generator effective to transmit a pulsating signal current to said belt when placed proximate thereto, a signal receiver spaced from said belt at a fixed position therealong, and control means between the receiver and motor for controlling the operation of the latter in response to the received signal.

4. In a mine conveyor belt control system, an electrically conductive endless belt, a motor operably coupled to drive said belt, a portable signal generator effective to transmit a signal to said belt when proximate thereto, a signal receiver fixed proximate said belt, an amplifier for the received signal, and control means between the amplifier and motor for controlling the operation of the latter in response to the transmitted signal.

5. In a mine conveyor belt control system, an electrically conductive endless belt, a motor operably coupled to drive said belt, a portable signal generator comprising a transformer including a split primary coil and a second coil, means for alternately exciting said primary in opposite directions to generate an alternating current signal in said secondary, a transmitting coil connected to said secondary and adapted to be placed in electro-magnetically coupled relation with said belt for inducing a pulsating signal current in said belt, a signal receiver including a receiving coil spaced at a fixed distance from said belt in electro-magnetically coupled relation therewith, means for amplifying the signal received in said receiving coil, and control means between the amplifying means and motor for controlling the operation of the latter in response to the received signal.

6. In a mine conveyor belt control system, an electrically conductive endless belt, a motor operably coupled to drive said belt, a portable signal generator including a transmitting coil adapted to be placed in electro-magnetically coupled relation with said belt and means for generating a pulsating signal current in said transmitting coil, a signal receiver including a receiving coil fixed proximate said belt in electro-magnetically coupled relation therewith, means for amplifying the received signal current, and control means between the amplifying means and motor for controlling the operation of the latter in response to the received signal current.

7. In a mine conveyor belt control system, an electrically conductive endless belt, a motor operably coupled to drive said belt, a portable signal generator including: a transformer having a split primary coil and a secondary coil, means for alternately exciting said primary in opposite directions to generate an alternating current signal in said secondary, said signal generator having a housing, one end of said secondary being grounded to said housing and the other end being connected to an antenna carried by said housing and insulated therefrom and disposed to be capacitance-coupled with said belt when the signal generator is placed in proximity therewith to transmit said signal to said belt, a receiver including a receiving antenna fixed proximate said belt in capacitance-coupled relation therewith, means for amplifying the received signal, and control means between the amplifier and motor for controlling the operation of the latter in response to the received signal.

8. In a mine conveyor belt control system, an electrically conductive endless belt, a motor operably coupled to drive said belt, a portable signal generator including a transmitting antenna adapted to be placed in capacitance-coupled relation with said belt and means for generating a pulsating signal charge in said transmitting antenna, a signal receiver including a receiving antenna fixed proximate said belt in capacitance-coupled relation therewith, means for amplifying the received signal, and control means between the amplifier and motor for controlling the operation of the latter in response to the received signal.

ROGER M. BUCKERIDGE.
WILLIAM E. GOODMAN.

References Cited in the file of this patent

UNITED STATES PATENTS

| Number | Name | Date |
|---|---|---|
| 2,534,110 | Dice et al. | Dec. 12, 1950 |